United States Patent
Scherer et al.

(10) Patent No.: US 10,392,825 B2
(45) Date of Patent: Aug. 27, 2019

(54) CONCEPT FOR TRANSFERRING A VEHICLE FROM A START POSITION TO A TARGET POSITION

(71) Applicant: Robert Bosch GmbH, Stuttgart (DE)

(72) Inventors: Willi Scherer, Reutlingen (DE); Rolf Nicodemus, Bietigheim-Bissingen (DE); Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/736,471

(22) PCT Filed: May 12, 2016

(86) PCT No.: PCT/EP2016/060684
§ 371 (c)(1),
(2) Date: Dec. 14, 2017

(87) PCT Pub. No.: WO2017/001101
PCT Pub. Date: Jan. 5, 2017

(65) Prior Publication Data
US 2018/0171655 A1 Jun. 21, 2018

(30) Foreign Application Priority Data
Jul. 1, 2015 (DE) .................. 10 2015 212 313

(51) Int. Cl.
*E04H 6/42* (2006.01)
*G08G 1/14* (2006.01)
(Continued)

(52) U.S. Cl.
CPC .......... *E04H 6/422* (2013.01); *B62D 15/0285* (2013.01); *E04H 6/18* (2013.01);
(Continued)

(58) Field of Classification Search
CPC .......... E04H 6/422; E04H 6/424; E04H 6/18; B65D 15/0285; B60W 30/06
See application file for complete search history.

(56) References Cited

U.S. PATENT DOCUMENTS 9,805,601 B1 * 10/2017 Fields .............. G08G 1/096791
9,868,394 B1 * 1/2018 Fields .............. G08G 1/096791
(Continued)

FOREIGN PATENT DOCUMENTS

DE 202009000259 U1 3/2009
DE 102009029720 A1 12/2010
(Continued)

OTHER PUBLICATIONS

International Search Report dated Aug. 9, 2015, of the corresponding International Application PCT/EP2016/060684, filed May 12, 2016.

*Primary Examiner* — Kaitlin S Joerger
(74) *Attorney, Agent, or Firm* — Norton Rose Fulbright US LLP; Gerard Messina

(57) ABSTRACT

A method for transferring a vehicle from a start position to a target position, the two positions being enclosed by a multistory parking facility and the two positions being located in different stories of the parking facility, the vehicle utilizing an elevator system of the parking facility during the transfer in order to reach the story of the target position from the story of the start position, the transfer including a remote control of the vehicle and/or at least semi-autonomous travel of the vehicle. A parking system for vehicles, a vehicle, and a computer program are also described.

16 Claims, 3 Drawing Sheets

(51) Int. Cl.
  *B62D 15/02* (2006.01)
  *E04H 6/18* (2006.01)
  *G05D 1/02* (2006.01)

(52) U.S. Cl.
  CPC .......... *G05D 1/0282* (2013.01); *G08G 1/146* (2013.01); *E04H 6/424* (2013.01); *G05D 2201/0213* (2013.01)

(56) References Cited

U.S. PATENT DOCUMENTS

| | | | |
|---|---|---|---|
| 9,870,649 B1* | 1/2018 | Fields | G08G 1/096791 |
| 9,928,749 B2* | 3/2018 | Gil | H04W 4/70 |
| 9,940,834 B1* | 4/2018 | Konrardy | G08G 1/096725 |
| 9,944,282 B1* | 4/2018 | Fields | G05D 1/0055 |
| 9,957,048 B2* | 5/2018 | Gil | H04W 4/70 |
| 9,969,495 B2* | 5/2018 | Gil | H04W 4/70 |
| 9,972,054 B1* | 5/2018 | Konrardy | G07C 5/08 |
| 9,981,745 B2* | 5/2018 | Gil | H04W 4/70 |
| 10,019,901 B1* | 7/2018 | Fields | G08G 1/096791 |
| 10,026,130 B1* | 7/2018 | Konrardy | H04W 4/90 |
| 10,026,237 B1* | 7/2018 | Fields | G08G 1/096791 |
| 10,042,359 B1* | 8/2018 | Konrardy | G05D 1/0088 |
| 10,055,794 B1* | 8/2018 | Konrardy | H04W 4/90 |
| 10,065,517 B1* | 9/2018 | Konrardy | G05D 1/0088 |
| 10,086,782 B1* | 10/2018 | Konrardy | G05D 1/0088 |
| 10,089,693 B1* | 10/2018 | Konrardy | H04W 4/90 |
| 10,106,083 B1* | 10/2018 | Fields | G08G 1/096791 |
| 10,134,278 B1* | 11/2018 | Konrardy | G08G 1/166 |
| 2005/0207876 A1 | 9/2005 | Springwater | |
| 2008/0051951 A1* | 2/2008 | Camacho | E04H 6/422 701/23 |
| 2010/0156672 A1 | 6/2010 | Yoo et al. | |
| 2011/0274523 A1* | 11/2011 | Petalas | E04H 6/285 414/231 |
| 2012/0041675 A1* | 2/2012 | Juliver | G06Q 10/08 701/465 |
| 2012/0188100 A1 | 7/2012 | Min et al. | |
| 2013/0041917 A1* | 2/2013 | Woolworth | G08G 1/205 707/769 |
| 2013/0231824 A1* | 9/2013 | Wilson | G05D 1/0246 701/26 |

FOREIGN PATENT DOCUMENTS

| | | |
|---|---|---|
| DE | 102009046912 A1 | 5/2011 |
| DE | 102012222562 A1 | 6/2014 |
| DE | 102013222071 A1 | 4/2015 |
| JP | 2007014617 A | 1/2007 |

\* cited by examiner

CONCEPT FOR TRANSFERRING A VEHICLE FROM A START POSITION TO A TARGET POSITION

FIELD

The present invention relates to a method for transferring a vehicle from a start position to a target position. The present invention further relates to a vehicle, a parking system, and to a computer program.

BACKGROUND INFORMATION

German Patent Application No. DE 10 2012 222 562 A1 describes a system for managed parking areas for transferring a vehicle from a start position to a target position.

In a case of fully automated (autonomous) so-called valet parking (AVP), a vehicle is parked by its driver at a drop-off position, for example, in front of a parking garage, and, from there, the vehicle drives itself into a parking position/parking space and, from there, back to the drop-off position.

A great challenge associated with AVP is a mixed operation of AVP vehicles with manually guided vehicles and pedestrians. The traveling processes and parking/unparking processes may become much more complex as a result. This may be the case, in particular, when very long routes are to be traveled, because the AVP parking positions lie at a distant point relative to an entrance of the parking facility.

SUMMARY

An object of the present invention includes providing for an efficient transferring of a vehicle from a start position to a target position, the two positions being enclosed by a multistory parking facility and the two positions being located in different stories of the parking facility.

Advantageous embodiments of the present invention are described herein.

According to one aspect of the present invention, a method for transferring a vehicle from a start position to a target position is provided, the two positions being enclosed by a multistory parking facility and the two positions being located in different stories of the parking facility, the vehicle utilizing an elevator system of the parking facility during the transfer in order to reach the story of the target position from the story of the start position, the transfer including a remote control of the vehicle and/or at least semi-autonomous travel of the vehicle.

According to yet another aspect of the present invention, a vehicle is provided, including a control unit which is designed for at least semi-autonomously transferring the vehicle from a start position to a target position, the two positions being enclosed by a multistory parking facility and the two positions being located in different stories of the parking facility, the control unit being designed for guiding the vehicle, during the transfer, into an elevator system of the parking facility and/or out of the elevator system of the parking facility, so that the vehicle may reach the story of the target position from the story of the start position.

According to yet another aspect of the present invention, a parking system for vehicles is provided, including a multistory parking facility including an elevator system and a control unit which is designed for transferring a vehicle from a start position to a target position in a remotely controlled manner and/or for assisting an at least partially autonomously traveling vehicle during its at least partially autonomous travel from the start position to the target position, the two positions being enclosed by the parking facility and the two positions being located in different stories of the parking facility, the control unit being designed for guiding the vehicle in a remotely controlled and/or assisting manner during the transfer into an elevator system of the parking facility and/or for guiding the vehicle out of the elevator system of the parking facility in a remotely controlled and/or assisting manner, so that the vehicle may reach the story of the target position from the story of the start position.

According to yet another aspect of the present invention, a computer program is provided, which includes program code for carrying out the method according to the present invention when the computer program is run on a computer.

The present invention therefore includes, in particular and inter alia, utilizing an elevator system of the parking facility within the scope of an AVP process (AVP: automated valet parking, an automatic or fully automated parking process), so that the vehicle may reach the target position from the start position. This yields the technical advantage, in particular, that the vehicle may be efficiently transferred from the start position to the target position when the two positions are located in different stories of the parking facility.

Stories of a parking facility include, in particular, a first story, a basement, underground stories, and/or upper stories, in particular a lowermost story, and in particular an upper story.

A start position is, for example, a drop-off position and a target position is, for example, a parking position.

A drop-off position within the scope of the present invention is a position at which a driver of the vehicle may stop his/her vehicle for a remotely controlled and/or at least semi-autonomous parking process.

A parking position within the scope of the present invention is a position at which the vehicle is to park.

The vehicle is therefore transferred, for example, from the drop-off position to the parking position.

A start position is, for example, a parking position and a target position is, for example, a pick-up position. The vehicle is therefore transferred, for example, from the parking position to the pick-up position.

A pick-up position within the scope of the present invention is a position at which a vehicle is to be picked up after an end of a parking process.

According to one specific embodiment, the drop-off position is the same as the pick-up position or is different from the pick-up position.

In one specific embodiment, the vehicle is transferred from the drop-off position to the parking position and, after the end of a parking process, is transferred to the pick-up position, in particular back to the drop-off position.

A parking facility within the scope of the present invention may also be referred to as a parking area and is used as an area for parking vehicles. The parking facility therefore forms, in particular, one contiguous area which includes multiple parking spaces (in the case of a parking facility on private property) or parking zones (in the case of a parking facility on public property). According to one specific embodiment, the parking facility may be designed as a parking deck. In particular, the parking facility is designed as a parking garage.

"Autonomously" within the scope of the present invention means, in particular, that the vehicle navigates automatically, i.e., without any intervention by a driver. The vehicle therefore automatically travels in the parking facility without a driver needing to steer the vehicle for this purpose. This therefore means, in particular, that the control unit autonomously guides the vehicle. A guidance includes, in particular, a transverse guidance and/or a longitudinal guidance of the vehicle. In the case of autonomous driving, the driver him/herself therefore does not need to be in the vehicle. The control unit is therefore designed, in particular, for controlling a transverse guidance and/or a longitudinal guidance of the vehicle.

"Semi-autonomously" within the scope of the present invention means, in particular, that the vehicle is supported or assisted during its autonomous travel. This takes place, in particular, with the aid of the control unit of the parking system. A case of "assisting" means, for example, that the control unit of the parking system transmits a digital map of the parking facility to the vehicle via a communication network. As a result, the vehicle may autonomously travel in the parking facility based on the digital map.

A case of "assisting" means, for example, that the control unit of the parking system transmits the start position and/or the target position to the vehicle via a communication network.

A case of "assisting" means, for example, that the control unit of the parking system transmits position data and/or speed data from further vehicles located in the parking facility to the vehicle via a communication network. As a result, the control unit of the vehicle may take these further vehicles into consideration during its autonomous travel in the parking facility.

A case of "assisting" means, for example, that the control unit of the parking system transmits a setpoint trajectory of at least one part of a route to be traveled from the start position to the target position, in particular the route to be completely traveled from the start position to the target position, to the vehicle via a communication network. As a result, the control unit of the vehicle may adjust, for example, an actual trajectory of the vehicle to the setpoint trajectory.

A case of "assisting" means, in particular, an external support of the vehicle during its travel in the parking facility. Such a case of assisted travel is therefore referred to as a case of semi-autonomous travel.

The wording "partially autonomous" or "semi-autonomous" therefore includes the "autonomous" case, i.e., without external support.

According to one specific embodiment, the parking position is located in the uppermost story of the parking facility.

According to yet another specific embodiment, the parking position is located in the lowermost story of the parking facility.

According to one specific embodiment, the drop-off position is located in the first story of the parking facility.

According to yet another specific embodiment, the pickup position is located in the first story of the parking facility.

According to yet another specific embodiment, it is provided that an operation of the elevator system is controlled as a function of a movement of the vehicle during the transfer in order to reduce a waiting time of the vehicle at the elevator system.

This yields the technical advantage, in particular, that a waiting time of the vehicle at the elevator system may be reduced. In particular, a reduction includes a minimization.

According to yet another specific embodiment, it is provided that the vehicle autonomously requests a transport with the aid of the elevator system during the transfer. In this case, "requests" means, in particular, that a cabin or transport platform of the elevator system is to travel to the story of the start position, so that the vehicle may travel directly into the cabin or onto the transport platform when the vehicle arrives at the elevator system. For example, the control unit of the vehicle is designed for requesting the transport of the elevator system during the transfer.

This would yield the technical advantage, in particular, that a waiting time of the vehicle at the elevator system may be reduced, in particular minimized.

In one specific embodiment, it is provided that the vehicle itself controls the elevator system (for example, with the aid of its control unit) in order to be transported from the story of the start position to the story of the target position with the aid of the elevator system. This means that the control unit of the vehicle is designed, for example, for controlling the elevator system in such a way that the vehicle is transported from the story of the start position to the story of the target position.

In one specific embodiment, it is provided that the elevator system is controlled with the aid of a vehicle-external control unit, for example with the aid of the control unit of the parking system, in order to transport the vehicle from the story of the start position to the story of the target position with the aid of the elevator system. The vehicle-external control unit is therefore preferably designed for controlling the elevator system in order to transport the vehicle from the story of the start position to the story of the target position with the aid of the elevator system.

In one specific embodiment, it is provided that the vehicle autonomously requests a transport with the aid of the elevator system during the transfer, the elevator system being controlled with the aid of a vehicle-external control unit, for example with the aid of the control unit of the parking system, in order to transport the vehicle from the story of the start position to the story of the target position with the aid of the elevator system.

According to yet another specific embodiment, it is provided that at least one of the two positions (preferably both positions) is located within an area which is blocked to manually guided vehicles and/or to persons.

This yields the technical advantage, in particular, that a mixed operation of manually guided vehicles and/or of persons and an AVP vehicle (i.e., the remotely controlled and/or at least semi-autonomously traveling vehicle) in the area may be avoided. As a result, safety may be increased for persons, in particular. In particular, a risk of collision between an AVP vehicle and a manually guided vehicle may be minimized.

In one specific embodiment, it is provided that at least one of the two positions (preferably both positions) is located within an area which is permitted to manually guided vehicles and/or to persons. As a result, a mixed operation is advantageously permitted, which may effectuate a greater acceptance of the concept according to the present invention. Furthermore, the parking facility may then be utilized both by manually guided vehicles and by AVP vehicles, which may effectuate an efficient utilization of the parking facility. A permitted area is therefore an area, in particular, which is open or free to persons and/or manually guided vehicles.

According to one specific embodiment, it is provided that the vehicle is designed or configured for implementing or carrying out the method according to the present invention.

According to yet another specific embodiment, it is provided that the parking system is designed or configured for implementing or carrying out the method according to the present invention.

According to one specific embodiment, the parking system includes a communication interface which is designed for communicating with the vehicle, in particular with the control unit. This takes place via a communication network, in particular.

In yet another specific embodiment, the vehicle includes a communication interface. The communication interface is designed, in particular, for communicating with the parking system, in particular with the control unit of the parking system. This takes place via a communication network, in particular.

The communication network includes, in particular, a WLAN network and/or a mobile network.

According to one specific embodiment, a communication will be or is encrypted via the communication network.

According to one specific embodiment, the parking system is comprised by a parking facility administration system. The parking facility administration system may be referred to in particular as a parking facility management system.

When the parking facility is comprised by a parking garage, the parking facility administration system may be referred to as a parking garage administration system, in particular as a parking garage management system.

Specific embodiments of the vehicle and of the parking system similarly result from corresponding specific embodiments of the method, and vice versa. Technical functionalities of the vehicle and of the parking system therefore similarly result from corresponding technical functionalities of the method, and vice versa.

The present invention is explained in greater detail below with reference to preferred exemplary embodiments.

DETAILED DESCRIPTION OF EXAMPLE EMBODIMENTS

Figure 1:
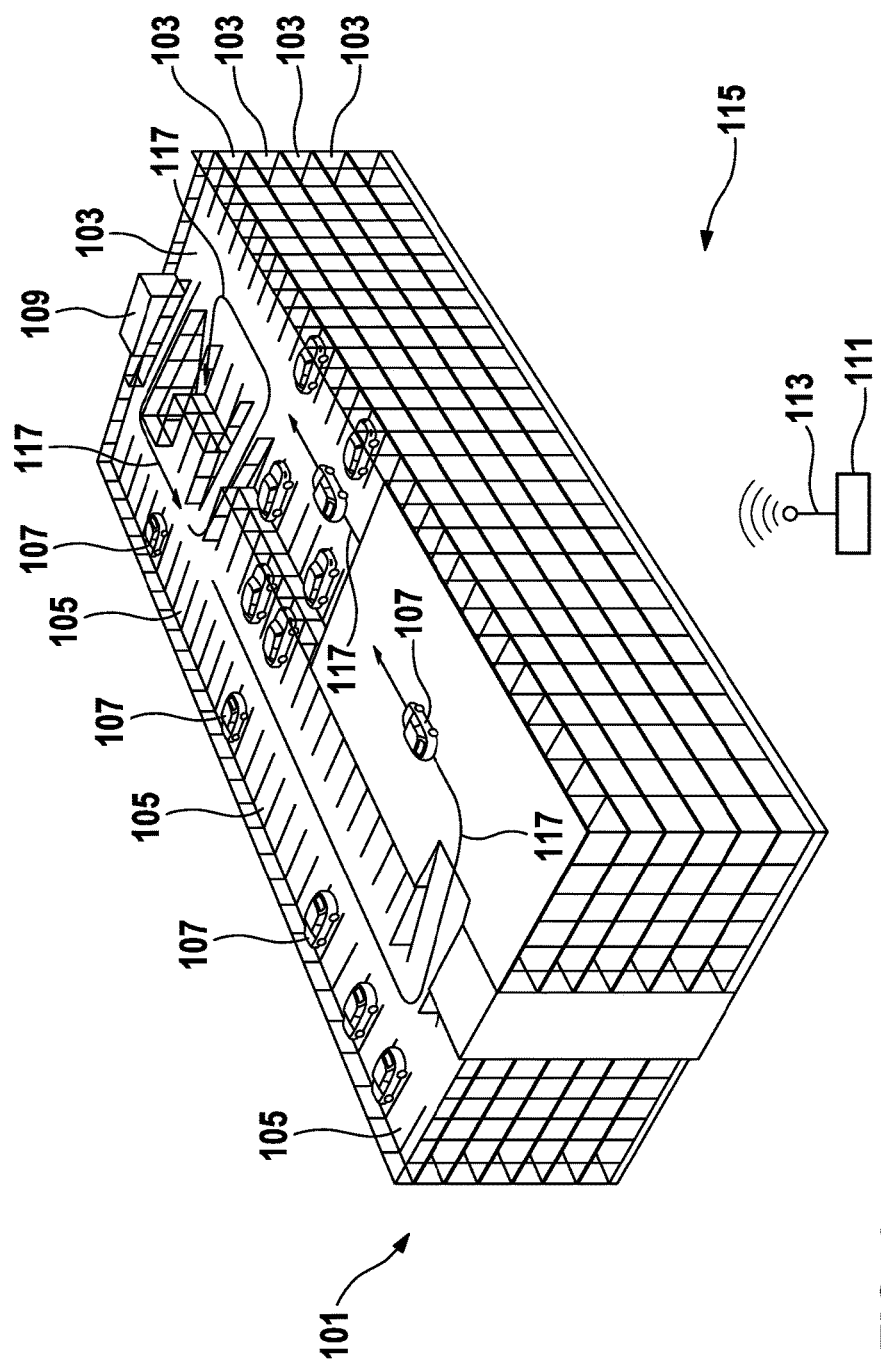
FIG. 1 shows an oblique top view of a parking system.

The same reference numerals may be used for the same features in the following.

FIG. 1 shows a top view, obliquely from above, of a multistory parking facility 101. Parking facility 101 is designed as a parking garage. Parking facility 101 includes several stories 103. Multiple parking positions 105 on uppermost story 103 of parking facility 101 are indicated symbolically and by way of example. Although not explicitly indicated, further stories 103 also include corresponding parking positions 105. Multiple vehicles 107, which are stopped in a parking position 105 in uppermost story 103, are indicated symbolically and by way of example. Although not explicitly indicated, further vehicles 107 may also be stopped in corresponding parking positions in further stories 103.

Parking facility 101 includes an elevator system 109. Elevator system 109 is designed, in particular, for transporting a vehicle from one story to a further story.

Furthermore, a control unit 111 is provided. Control unit 111 is designed for transferring a vehicle from a start position to a target position in a remotely controlled manner and/or for assisting an at least partially autonomously traveling vehicle during its at least partially autonomous travel from a start position to a target position. In this case, the two positions are located in different stories 103 of parking facility 101.

Control unit 111 is designed for guiding the vehicle into elevator system 109 in a remotely controlled and/or assisting manner and/or for guiding the vehicle out of elevator system 109 in a remotely controlled and/or assisting manner. As a result, the vehicle may advantageously reach the story of the target position from the story of the start position.

The target position may be, for example, a parking position 105 on uppermost story 103. The start position is, for example, a pick-up position (not explicitly represented) in the first story. Control unit 111 may therefore remotely control a vehicle from the first story to uppermost story 103, for example. In particular, the start position may be a parking position 105 in uppermost story 103. In this case, the target position is a pick-up position in the first story of parking facility 101.

Control unit 111 includes a wireless communication interface 113. Control unit 111 may therefore communicate, via its communication interface 113, with the vehicle with the aid of a wireless communication network. In particular, control unit 111 may transmit control commands to the vehicle via the communication network for the purpose of remotely controlling the vehicle.

Control unit 111 may include a plurality of such wireless communication interfaces 113 which are spatially distributed in parking facility 101, so that sufficient radio coverage is advantageously made possible.

Although control unit 111 is indicated outside of parking facility 101 in FIG. 1, it is provided, in particular, that control unit 111 may be situated within the parking facility.

FIG. 1 therefore shows a parking system 115 including multistory parking facility 101 and control unit 111.

Reference numeral 117 denotes arrows which are symbolically indicated on uppermost story 103 of parking facility 101. These arrows 117 are intended to symbolize or characterize exemplary routes of vehicles 107 to their parking positions 105.

Figure 2:
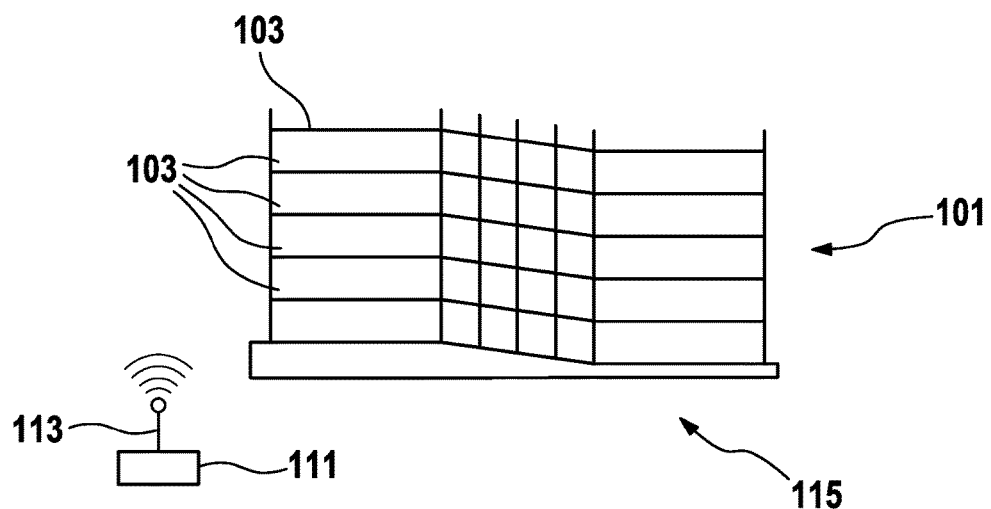
FIG. 2 shows a simplified lateral sectional view of the parking system from FIG. 1.

FIG. 2 shows a simplified sectional view of parking facility 101. Parking positions 105 and vehicles 107 are not indicated, for the sake of clarity. Elevator system 109 is also not shown, for the sake of clarity.

Figure 3:
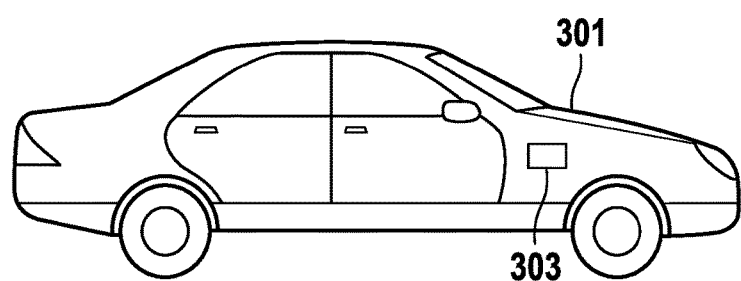
FIG. 3 shows a vehicle.

FIG. 3 shows a vehicle 301.

Vehicle 301 includes a control unit 303 which is designed for at least semi-autonomously, in particular fully autonomously, transferring vehicle 301 from a start position to a target position, the two positions being enclosed by a multistory parking facility and the two positions being located in different stories of the parking facility, control unit 303 being designed for guiding vehicle 301, during the transfer, into an elevator system of the parking facility and/or out of the elevator system of the parking facility, so that vehicle 301 may reach the story of the target position from the story of the start position.

Control unit 303 of vehicle 301 may include, for example, a communication interface. This communication interface is a wireless communication interface, in particular. Vehicle 301 may therefore communicate with control unit 111 of parking system 115 according to FIG. 1, for example.

According to one specific embodiment, vehicle 301 includes one or multiple surroundings sensors. The one surroundings sensor or the multiple surroundings sensors includes or include, for example, the following surroundings sensors: radar sensor, video sensor, laser sensor, LIDAR sensor, and ultrasonic sensor.

Vehicle 301 may be designed, for example, for autonomously requesting a transport with the aid of elevator system 109. This means, in particular, that control unit 303 is therefore designed for autonomously communicating with control unit 111 and for requesting therefrom the transport with the aid of elevator system 109. The request may include, for example, a time at which elevator system 109 is to be ready for the transport. In order to ascertain this time, it may be estimated, for example, how long the vehicle needs to travel from its present position to elevator system 109.

Figure 4:
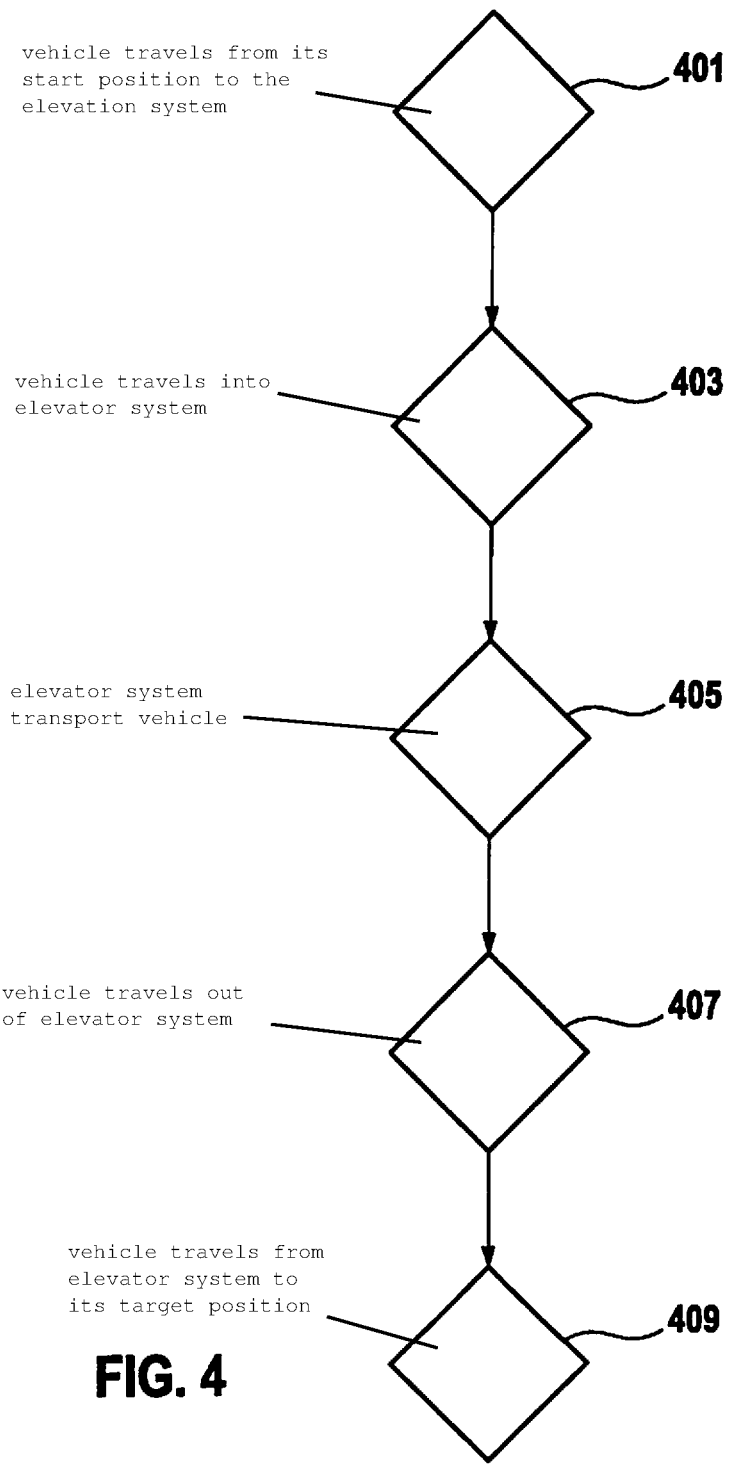
FIG. 4 shows a flow chart of a method for transferring a vehicle from a start position to a target position.

FIG. 4 shows a flow chart of a method for transferring a vehicle from a start position to a target position, the two positions being enclosed by a multistory parking facility and the two positions being located in different stories of the parking facility.

According to a step 401, the vehicle travels from its start position to the elevator system. This takes place, in particular, autonomously, under assisting guidance, or in a remotely controlled manner. In a step 403, the vehicle travels into the elevator system. This means, for example, that the vehicle therefore enters an elevator cabin or travels onto a transport platform of the elevator system.

In a step 405, the elevator system then transports the vehicle from the story of the start position to the story of the target position.

In a step 407, the vehicle travels out of the elevator system. This takes place, in particular, autonomously, under assisting guidance, or in a remotely controlled manner.

In a step 409, the vehicle then travels from the elevator system to its target position and also does so, in particular, in a remotely controlled manner, under assisting guidance, or autonomously.

In summary, an elevator system—which is also colloquially referred to as an elevator—is utilized for an AVP vehicle, so that the vehicle may reach a target position from a start position when the two positions are located in different stories of the parking facility.

This means, in particular, that the AVP vehicle is therefore guided from its drop-off position, which may also be referred to as a drop zone, directly to an elevator system which is preferably located very close to the drop zone. The elevator system transports the AVP vehicle to the appropriate level, i.e., the appropriate story (for example, the basement or the highest level). After the vehicle has arrived at the appropriate story, the vehicle travels from the elevator system to its parking position. The travel from the parking position back to the drop zone takes place in a similar manner.

According to one specific embodiment, this process, i.e., the travel from the drop zone to the parking position and back, including the transport with the aid of the elevator system, is controlled with the aid of the parking facility management system.

One advantage according to the present invention is considered to be, in particular, that an AVP driving operation may be easily separated from a mixed operation. This takes place, in particular, when at least one of the two positions, preferably both positions, is/are located within an area which is blocked to manually guided vehicles and/or to persons. As a result, the AVP process becomes very substantially simpler and damages as well as injuries may be reduced.

What is claimed is:

1. A method for transferring a vehicle from a start position to a target position, the method comprising:
   using an elevator system of the parking facility during the transfer from the start position to the target position, to move the vehicle to a story of the target position from another story of the start position, the transfer including at least one of: (i) a remote control of the vehicle, and (ii) at least semi-autonomous travel of the vehicle;
   wherein the start position and the target position are at a multistory parking facility, and wherein the start position and the target position are located in different stories of the parking facility relative to one another, and
   wherein the vehicle controls the elevator system to be transported from the another story of the start position to the story of the target position with the elevator system.

2. The method as recited in claim 1, wherein an operation of the elevator system is controlled as a function of a movement of the vehicle during the transfer to reduce a waiting time of the vehicle at the elevator system.

3. The method as recited in claim 1, wherein the vehicle autonomously requests a transport with the elevator system during the transfer.

4. The method as recited in claim 1, wherein the elevator system is controlled with a vehicle-external control unit to transport the vehicle from the another story of the start position to the story of the target position with the elevator system.

5. The method as recited in claim 1, wherein at least one of the start position and the target position is located within an area which is blocked to at least one of manually guided vehicles and persons.

6. The method as recited in claim 1, wherein at least one of the start position and the target position is located within an area which is permitted to at least one of manually guided vehicles and persons.

7. A vehicle, comprising:
   a control unit which is configured for at least semi-autonomously transferring the vehicle from a start position to a target position, and for guiding the vehicle, during the transfer, at least one of: (i) into an elevator system of the parking facility, and (ii) out of the elevator system of the parking facility, so that the vehicle moves to a story of the target position from another story of the start position;
   wherein the start position and the target position are at a multistory parking facility, and wherein the start position and the target position are located in different stories of the parking facility relative to one another, and
   wherein the vehicle controls the elevator system to be transported from the another story of the start position to the story of the target position with the elevator system.

8. The vehicle as recited in claim 7, wherein the control unit is configured for autonomously requesting a transport with the elevator system during the transfer.

9. A parking system for vehicles, comprising:
   a multistory parking facility including an elevator system and a control unit for at least one of: (i) transferring a vehicle from a start position to a target position in a remotely controlled manner, and (ii) assisting an at least partially autonomously traveling vehicle during its at least partially autonomous travel from the start position to the target position;
   wherein the start position and the target position are at the parking facility, and wherein the start position and the target position are located in different stories of the parking facility relative to one another, wherein the control unit is configured for at least one of: (i) guiding the vehicle in a remotely controlled, (ii) assisting manner during the transfer into an elevator system of the parking facility, and (iii) guiding the vehicle out of the elevator system of the parking facility in at least one of a remotely controlled and assisting manner, so that the vehicle moves to the story of the target position from the another story of the start position;

wherein the start position and the target position are at the multistory parking facility, and wherein the start position and the target position are located in different stories of the parking facility relative to one another, and wherein the vehicle controls the elevator system to be transported from the another story of the start position to the story of the target position with the elevator system.

10. The parking system as recited in claim 9, wherein the control unit is configured for controlling an operation of the elevator system as a function of a movement of the vehicle during the transfer to reduce a waiting time of the vehicle at the elevator system.

11. A non-transitory computer-readable storage medium on which is stored a computer program, which is executable by a processor, comprising:
a program code arrangement including program code for transferring a vehicle from a start position to a target position, by performing the following:
using an elevator system of the parking facility, during the transfer, from the start position to the target position to move the vehicle to the story of the target position from the another story of the start position, the transfer including at least one of a remote control of the vehicle, and iii) at least semi-autonomous travel of the vehicle;

wherein the start position and the target position are at a multistory parking facility, and wherein the start position and the target position are located in different stories of the parking facility relative to one another, and wherein the vehicle controls the elevator system to be transported from the another story of the start position to the story of the target position with the elevator system.

12. The computer-readable storage medium as recited in claim 11, wherein an operation of the elevator system is controlled as a function of a movement of the vehicle during the transfer to reduce a waiting time of the vehicle at the elevator system.

13. The computer-readable storage medium as recited in claim 11, wherein the vehicle autonomously requests a transport with the-elevator system during the transfer.

14. The computer-readable storage medium as recited in claim 11, wherein the elevator system is controlled with a vehicle-external control unit to transport the vehicle from the another story of the start position to the story of the target position with the elevator system.

15. The computer-readable storage medium as recited in claim 11, wherein at least one of the start position and the target position is located within an area which is blocked to at least one of manually guided vehicles and persons.

16. The computer-readable storage medium as recited in claim 11, wherein at least one of the start position and the target position is located within an area which is permitted to at least one of manually guided vehicles and persons.

* * * * *